United States Patent [19]

Himsley et al.

[11] Patent Number: 4,536,287
[45] Date of Patent: Aug. 20, 1985

[54] PIPING FOR USE IN LIQUID COLLECTION AND DISTRIBUTION

[75] Inventors: Alexander Himsley, Toronto; John A. Bennett, Queensville, both of Canada

[73] Assignee: Himsley Engineering Limited, Toronto, Canada

[21] Appl. No.: 601,781

[22] Filed: Apr. 18, 1984

[51] Int. Cl.³ .............................................. B01D 23/20
[52] U.S. Cl. .................................................. 210/293
[58] Field of Search ................ 210/274, 279, 291, 293

[56] References Cited

U.S. PATENT DOCUMENTS

| | | | |
|---|---|---|---|
| 2,767,852 | 10/1956 | Ellila | 210/274 |
| 2,956,682 | 10/1960 | Steaman | 210/291 |
| 3,717,254 | 2/1973 | Benecke | 210/279 |
| 3,826,375 | 7/1974 | Fournier | 210/291 |
| 4,064,050 | 12/1977 | Heaney et al. | 210/293 |
| 4,094,790 | 6/1978 | Schmitt, Jr. | 210/291 |

Primary Examiner—John Adee
Attorney, Agent, or Firm—Ridout & Maybee

[57] ABSTRACT

Piping for use in liquid collection and distribution, e.g. in liquid-solid contact vessels, has an extruded pipe having on one side a pair of outwardly-projecting spaced arms each having a re-entrant lip forming a support channel with re-entrant sides extending along the channel. Channel-section strainer members are slid endwise into the support channel with the sides of the strainer channel being received between the lip and the outer surface of the pipe and with the bottom of the strainer channel, which is provided with strainer slots or perforations, bridging between the support channel sides. In use, orifices are formed through the side wall of the pipe to communicate with the interior of the support channel to provide for distribution and collection of liquids through the strainer members. The structure provides a screened slot extending continuously along the length of the pipe, and is easily assembled without requiring special tools.

13 Claims, 7 Drawing Figures

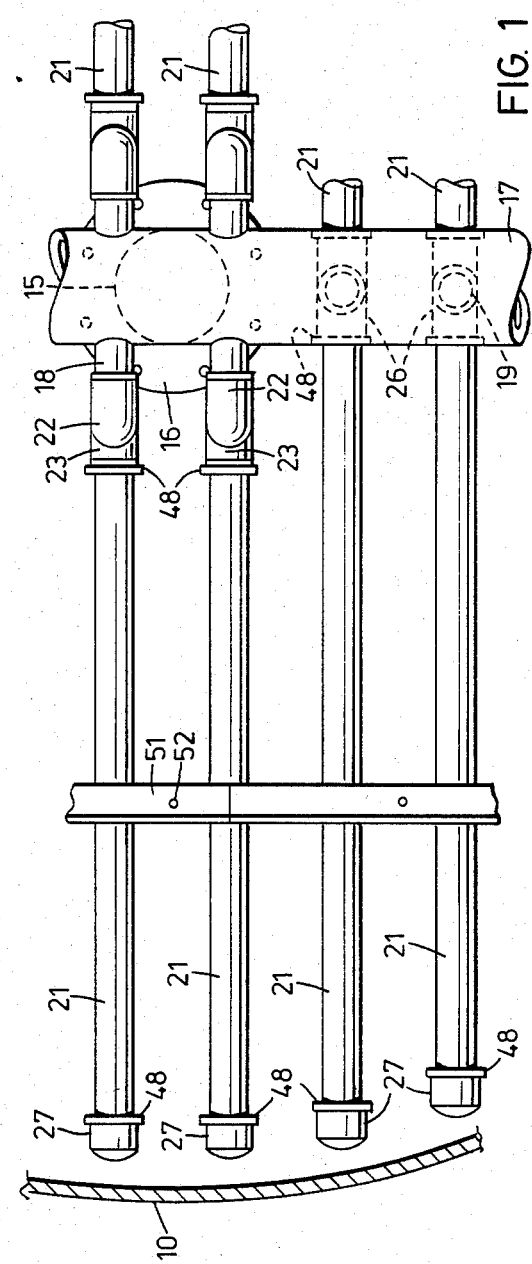
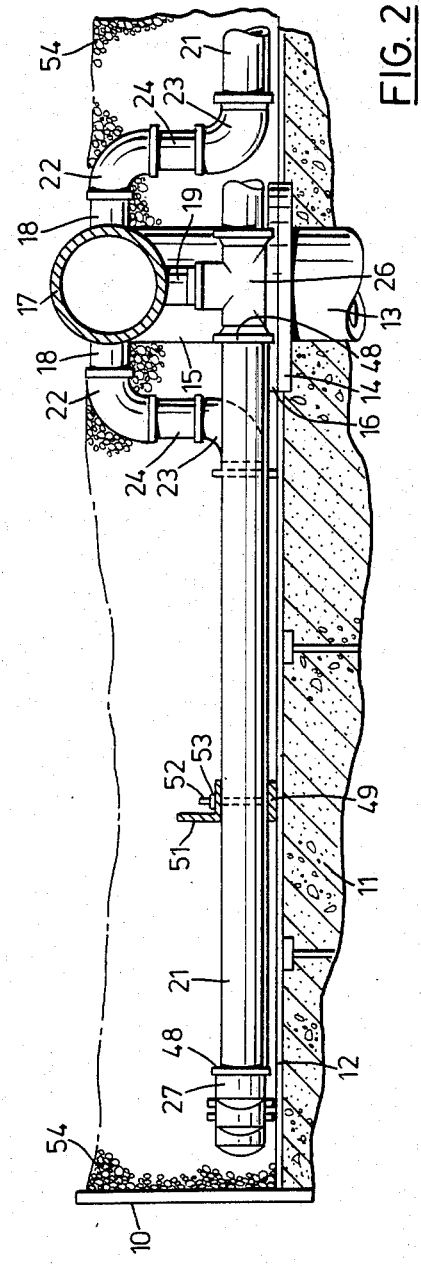
FIG. 1
FIG. 2

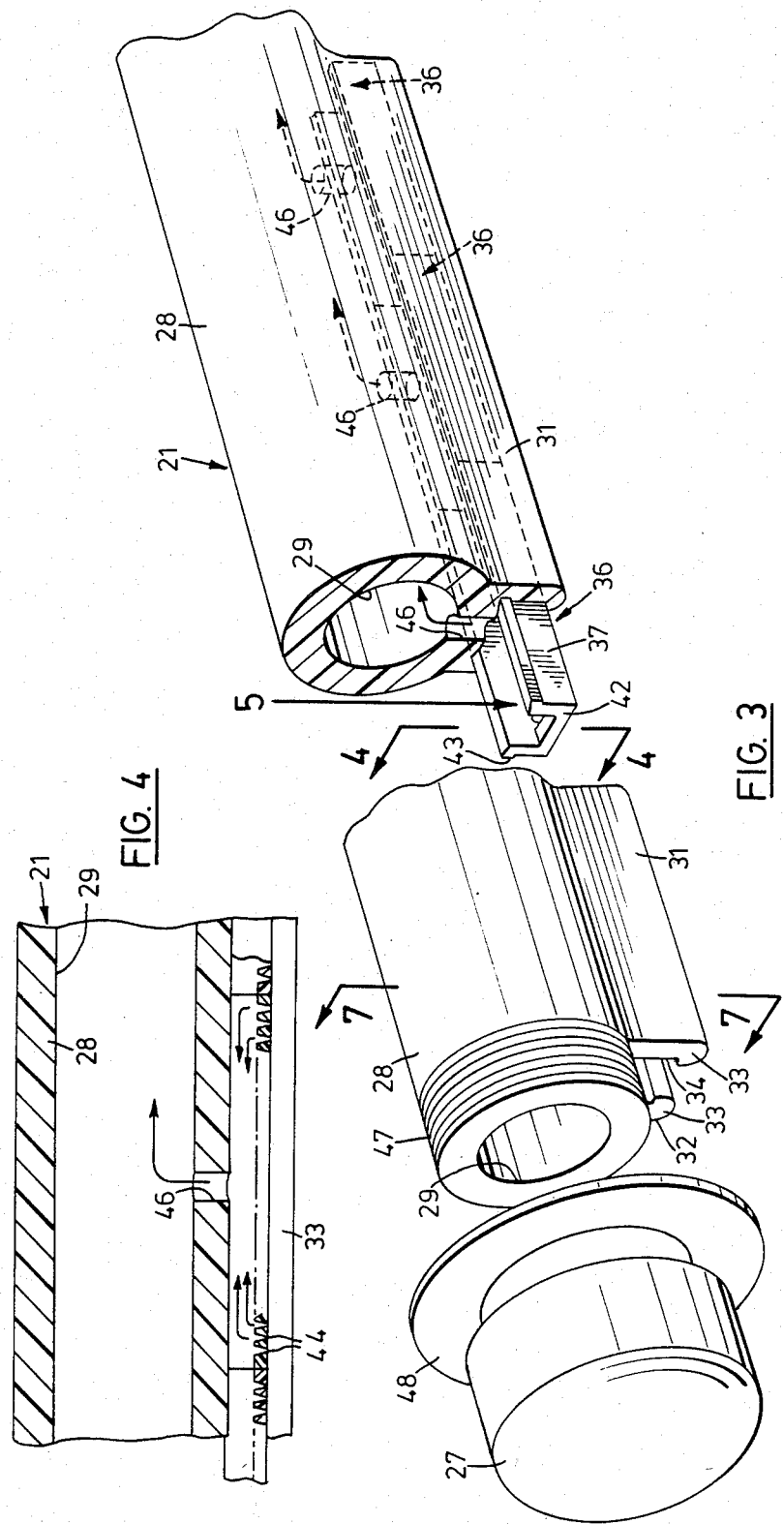

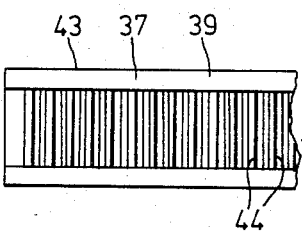
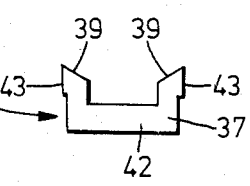
FIG. 5  FIG. 6
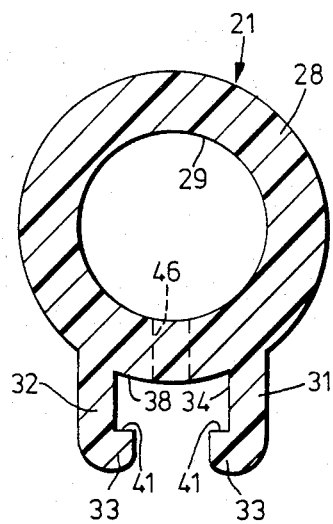
FIG. 7

PIPING FOR USE IN LIQUID COLLECTION AND DISTRIBUTION

The present invention relates to piping for use in liquid collection and distribution for example in liquid-solid contact apparatus such as ion-exchange columns containing ion-exchange resin particles, or other apparatus in which liquids are flowed into and withdrawn from beds comprising solid particles.

It is known to use for this purpose piping which is formed with apertures spaced apart along its length. The exterior of the piping is wrapped tightly with wire to form a screen consisting of parallel strands of wire extending over the apertures. The spacing between adjacent turns of the wire is arranged so that it is sufficient to permit liquids to flow freely therethrough, but prevents the passage of the solid particles, which are thereby prevented from being drawn into or otherwise passing into the liquid collection and distribution system. The fabrication of the wire screen-wrapped pipes is however relatively time-consuming and expensive.

There are also known collecting and distributing units in the form of hollow bodies of spherical or cylindrical shape which are molded of plastic and are formed with hollow stems which in use are received in holes spaced apart at intervals along a main or header pipe. The units are usually disposed vertically and have strainer slots in their upwardly extending side surfaces. Because of their relatively complex configuration, the hollow bodies usually have to be molded in at least two parts which are united by a plastic welding or other bonding operation. The bonding operation can however be difficult to control, leading to the possibility of a gap being present or opening up under the pressure of the weight of material in the liquid-solid contact apparatus, through which solid particles may pass. Further there is the difficulty that, as the flow of liquid into and out of the solids bed takes place only at the spaced locations represented by the individual collecting and distributing units, there is increased possibility of "hideout" of the treatment solutions in zones of the solids bed spaced between the units, which zones tend to be unaffected by the various treatment solutions introduced and withdrawn during the various stages in the treatment cycle, thus rendering the liquid-solid reactions less efficient. This problem can be particularly acute in the case in which the units are employed in an underdrain system disposed adjacent the bottom of a solids bed, since, owing to the geometry of the units and their method of connection to the header pipe, the strainer slots are necessarily arranged some distance above the level of the bottom of the solids bed.

The present invention relates to piping whereby these disadvantages may be avoided or reduced, and provides piping for use in liquid collection and distribution comprising in combination an extruded pipe having in cross-section an interior opening and on one side a pair of outwardly projecting spaced arms each having a re-entrant lip adjacent its outer end, thereby forming a support channel with re-entrant sides extending along the pipe, and at least one channel-section strainer member adapted to be slid endwise longitudinally into the support channel with each side of the channel of the strainer member being received snugly between the lip of a respective support channel side and the outer surface of the pipe and the bottom of the channel section strainer bridging between the support channel sides and being formed with strainer perforations.

In use, a liquid collecting and distributing system can be readily built up from the above piping and strainer components. Flow orifices may be formed through the wall of the pipe between the sides of the support channel of diameters and at spacings required to achieve desired flow distributions. The strainer members may be introduced into the support channels without requiring any special tools and the structure of the support channel and of the strainer members may provide for secure locking of the strainers in place. End capping means may be applied at one end of the piping to close off the end of the interior opening in the pipe and the end of the channel in the strainer member. Conveniently, a portion of the support channel structure adjacent each end of the pipe may be removed and the exposed ends of the pipe may be threaded to receive end capping means and to make a connection to a main conduit, respectively. Advantageously, a plurality of strainer members are provided, each being of a uniformly short length as compared with the length of the pipe. The strainer members may be fitted into the support channel in end-to-end abutment, to provide a strainer extending continuously along the support channel. This provides a relatively large elongated strainer area, thus providing for improved uniformity of distribution and collection of liquids from and to the piping structure. Further, the pipe and strainer members are well adapted to be produced by relatively low cost manufacturing techniques and in the assembled condition provide a robust structure well adapted to withstand the pressures and stresses to which they are subjected in use in liquid-solid contact apparatus. The invention will now be more fully described, by way of example only, with reference to the accompanying drawings, in which:

FIG. 1 shows a plan view, partly in section of the lower region of liquid-solid contact vessel having an underdrain system formed of spaced lateral piping in accordance with the invention;

FIG. 2 shows a side view, partly in section, of the underdrain system of FIG. 1;

FIG. 3 is a partially fragmentary and partially exploded perspective view on an enlarged scale of piping in accordance with the invention;

FIG. 4 shows a cross-sectional view taken on the line 4—4 in FIG. 3;

FIG. 5 shows a view of the upper surface of the strainer member, taken on the arrow 5 in FIG. 3;

FIG. 6 shows an end view of the strainer member of FIG. 5; and

FIG. 7 shows a transverse cross-section through the extruded pipe material, taken on the line 7—7 in FIG. 3.

Referring to the drawings, wherein like reference numerals indicate like parts, FIGS. 1 and 2 show a liquid distributing and collecting system, in this example an underdrain system, installed in the bottom of a liquid-solid contact vessel, in this example an ion-exchange column. The column consists of a cylindrical side wall 10, a base e.g. of concrete 11 and a horizontally extending division plate 12 defining the bottom of the column. Usually, the interior of the side wall 10 and the upper surface of the division plate 12 will be lined with an inert, e.g. rubber, lining (not shown). In the example shown, a main inlet-outlet pipe 13 extends upwardly through the centre of the base 11, and terminates at an upper flange 14, approximately coplanar with the division plate 12. Connected to the pipe 13 is a T-shape header pipe consisting of a relatively short vertically-extending riser 15 formed with a flange 16 bolted to the flange 14 and a transverse header 17. Adjacent the riser 15 the transverse header 17 is formed with horizontally-extending side branches 18. At other points along its length, the transverse header 17 is formed with vertically-extending lower branches 19. The opposite ends of the transverse header 17 adjacent the side wall 10 are capped off. A series of regularly-spaced parallel lateral pipes 21 are connected to the horizontal branches 18 through threaded elbows 22 and 23 and threaded nipples 24 and to the downwardly-extending branch pipes 19 through threaded T fittings 26. The laterals 21, illustrated in more detail in FIGS. 3 to 7 are capped off at their ends adjacent the cylindrical wall 10 by threaded end caps 27.

As shown in FIGS. 3 to 7, each lateral 21 is formed from an extruded pipe length 28 defining an interior opening 29. The extruded cross-section, as best seen in FIG. 7 includes a pair of outwardly projecting spaced arms 31 and 32 each having a re-entrant lip 33 adjacent its outer end, thus defining a support channel 34 with re-entrant channel sides extending longitudinally along the pipe 28. Desirably, the extruded pipe 28 is symmetrical about a transverse median line, and the arms 31 and 32 extend symmetrically with respect to the transverse median. In the preferred form, as shown, the pipe 28 is generally circular in cross-section, and the arms 31 and 32 are parallel and extend symmetrically with respect to a diameter of the pipe 28. Various materials are known which are extrudable to provide an extruded pipe length of the cross-section shown, for example various synthetic resin materials and metals and alloys, such as aluminum and alloys thereof. In the preferred form the pipe is extruded from a synthetic resin material which has good properties of mechanical strength over a wide range of temperatures, and of chemical inertness with respect to acids, alkalis, and other inorganic solutions likely to be encountered in liquid-solid contact processes. One particularly preferred material for the extruded pipe 28 is the modified polyphenylene oxide polymer available under the trade mark NORYL from Canadian General Electric Co. Ltd., Toronto, Canada. This is characterized by excellent resistance to acids, alkalis and other corrosive liquids and excellent mechanical properties over temperatures ranging from about 0° C. to 125° C.

The laterals 21 are provided with strainer members 36 which are received within the support channels 34. Each strainer member 36 is of a channel section with an external configuration adapted to be received snugly within the support channel 34. In the preferred form as shown, each member 36 has channel sides 37 which are adapted to be received snugly between the inner edges of the re-entrant lips 33 of the support channel 34 and the outer surface 38 of the pipe between the arms 31 and 32. The upper edges 39 of the channel sides 37 are preferably inclined inwardly downwardly to conform to the angle defined between the curved surface 38 of the pipe 28 and the inner sides of the support channel 34, and preferably the inner edges 41 of the lip portions 33 define with the inner sides of the support channel 34 an angle, in this case approxiately a right angle, conforming to the angle defined between the exterior of the channel sides 37 and the bottom 42 of the strainer member. In the preferred form, the outer faces of the channel walls 37 of the strainer members 36, as seen in FIG. 6, incline upwardly outwardly at a small angle, e.g. of about 2°, away from the vertical and, adjacent the upper edge of each side wall 37, the side wall is formed with an approximately rectangular section wear rib 43 extending continuously along the length of the strainer member 36 and stepped slightly outwardly from the lower portion of the side wall 37. When the strainer member is inserted endwise longitudinally into the support channel 34, the inner surfaces of the arms 31 and 32 grip the outer sides of the wear ribs 43 and apply a small inwardly directed compressive force. The wear ribs 43 provide for a secure engagement of the strainer member 43 within the support channel 34 and reduce the area of contact between the channel sides 37 of the strainer member and the arms 31 and 32, thus reducing the chances of the strainer member 36 sticking or jamming as it is slid longitudinally through the support channel 34.

The bottom 42 of the strainer member preferably has a generally planar, smooth surface, interrupted by a series of narrow transversely-extending slots 44 spaced apart regularly longitudinally along the length of the strainer member. Merely by way of example, it may be mentioned that the slots may be about 0.01 inch in width and about 0.5 inch in length, the ends of each slot being approximately in registry with the inner edges of the re-entrant lip portions 33 when the strainer member 36 is inserted into the support channel 34, and the slots being spaced apart longitudinally along the length of the strainer member 36 at a uniform spacing of about 0.12 inch. It will be appreciated, however, that the bottom wall of the strainer channel may be provided with slots or other perforations of other dimensions, configurations and spacings, which are sufficient to allow flow of liquids between the interior and exterior of the strainer member 36 without allowing ingress to the interior of the channel of solid particles of the dimensions usually encountered in solid-liquid contact apparatus. As is in itself conventional, the slots or other perforations formed in the strainer member 36 flare outwardly upwardly through the bottom 42 of the strainer 36, as best seen in FIG. 4, so that if a solid particle, e.g. an undersize resin bead or fragment thereof, should enter a strainer slot 44, it tends to pass relatively easily upwardly through the strainer structure, and does not tend to block the strainer opening slot. Preferably the outer sides of the lip portions 33 and of the adjacent portions of the channel sides 31 and 32 are smoothly rounded as shown so that there are no sharp edges which might tend to lead to attrition of particles in the solids bed.

As best seen in FIG. 3, preferably the strainer members 36 are each formed to a uniformly short length. Merely by way of example, it may be mentioned that, conveniently, each strainer member 36 may be about 4 inches in length. In use, in fabricating a lateral from the above-described extruded pipe and strainer members, a plurality of the strainer members 36 are inserted endwise into the support channel 34 to form a continuous strainer structure. As will be appreciated from FIG. 1, in order to provide an array of laterals 21 extending over substantially the whole of the cross-sectional area of the column or other treatment apparatus, a number of laterals 21 of varying lengths need to be constructed, and the use of strainer members 36 of standard, relatively short lengths facilitates fabrication of laterals of varying lengths corresponding to integral multiples of the lengths of the individual strainer members 36. The individual strainer members 36 may be formed of any material offering the properties of good mechanical strengths over varying temperatures and of chemical inertness required for service in the liquid-solid contact apparatus. The strainer members illustrated may, for example, be made from stainless steel by conventional metal-forming and machining techniques. If the strainer members are of metal, it would be desirable to use a synthetic resin pipe 28, so that problems of galvanic corrosion are avoided. In the preferred form, the strainer members are made from synthetic resin materials, more preferably from the NORYL resin material referred to above. The strainer members 36 as illustrated are well adapted to be molded by conventional injection-molding techniques.

In use, in the fabrication of the laterals 21 illustrated, an appropriate length of the extruded pipe material 28 is selected and sawn off from a continuous extruded length. Orifices are drilled through the side wall of the pipe 28, communicating between the interior opening 29 and the interior of the support channel 34, the orifices 46 being of such diameters and at spacings as will achieve desired flow properties for the liquids passing through the lateral 21. For example, the orifices 46 may be of such dimensions and spacings as are required to achieve a certain back pressure to ensure an even distribution of liquids along the length of the support channel when liquid is passed into or is withdrawn from one end of the lateral 21.

Before insertion of the strainer members 36 into the support channel 34, a portion of the arms 31 and 32 constituting the sides of the support channel adjacent each end of the pipe length 28 is removed e.g. by making longitudinal and transverse saw cuts. The length of the support channel 34 thus formed is desirably made an even multiple of the length of the members 36 so that when the latter are inserted into the channel 34, the ends of the strainer structure are flush with the end surfaces of the arms 31 and 32. The exterior surfaces of the pipe 28 thus exposed are formed with a screw thread 47, using conventional thread-forming apparatus. Individual strainer members 36 are then inserted endwise longitudinally into the support channel 34 from either end, the adjacent end surfaces of the members 36 butting together tightly, so as to form a strainer structure extending continuously along the length of the support channel, as indicated in FIGS. 3 and 4. One threaded end of the pipe length 28 may then be threaded into the elbow 23 or into the T fitting 26 connecting it to the main header pipe 17, and the opposite end of the pipe may be capped off using the capping member 27 which is provided with an internal thread mating with the thread 47 on the pipe length 28. In order to close off the exposed ends of the support channel 34, and prevent ingress of solid particles to the interior of the strainer structure 36, the inner end face of the cap member 27 and the end faces of the elbows 23 and of the T fittings 26 which receive the threaded ends of the pipe 28 may be formed to an external diameter such that they overlap and occlude the ends of the support channels 34. Alternatively, as illustrated, a washer 48 may be placed over the threaded ends of the pipe 28 before the pipe is secured at one end to the elbow 23 or to the T fitting 26 and before the threaded cap 27 is applied. The inner face of the washer 48 is pressed tightly against the sawn-off ends of the arms 31 and 32, and against the end of the strainer structure made up from the members 36, by the threaded engagement between the pipe 28 and the elbow 23, the T fitting 26 or the cap member 27, and closes off the ends of the support channel 34.

As illustrated, the laterals 21 may be retained in place in their desired spaced arrangement parallel to the bottom 12 of the column between a strip-like pad 49 secured to the bottom wall and extending transversely of the laterals 21 and an angle section bar 51 extending parallel to the pad 49 and secured at intervals thereto by threaded studs 52 and nuts 53. Following the installation of the underdrain system as shown, the column may be filled with solids 54, e.g. ion-exchange resin beads.

In use, the array of strainer members 36 as illustrated provide a continuous screened slot extending along the entire length of each lateral 21. This allows the free area of the orifices 46 in the laterals to be available at all times, even if a part of the screen structure were to become blocked.

With the arrangement as illustrated in FIGS. 1 and 2, the flow of liquid in or out of the screened strainer structure passes through a narrow gap defined between the bottom edges of the support channel 34 and the bottom 12 of the vessel. The horizontal velocity so created across the flat bottom of the vessel reduces or eliminates "hide-out" of solutions in areas of the bed of solids 54 adjacent the bottom 12. The arrangement as shown also directs the flow of liquid horizontally outwards from the laterals 21, e.g. during a backwashing step, such that any resin or other solid particles on the bottom 12 of the vessel between the laterals 21 are caught up by the lateral velocity of the liquid and are lifted up into the main body of the vessel.

It will be appreciated that an arrangement of laterals similar to that illustrated in FIGS. 1 and 2 may be employed to provide for inflow and outflow of liquids at any level spaced upwardly from the bottom of the vessel, e.g. to provide for countercurrent regeneration of a bed of ion-exchange resin present in the vessel.

The arrangement as illustrated has numerous advantages. The structure of the support channel 34 and of the strainer members 36 permits the strainers to be slid into place without employing special tools and without requiring lubricants. The strainer members 36 once in place are firmly locked in position, thus reducing any risk of particles of solids passing through into the interior of the support channel 34. The pipe 28 and strainer members 36 as illustrated provide a robust structure capable of withstanding high pressures from inside and out. Further, as noted above, the strainer members provide a screened slot extending along the whole length of the lateral 21, thus giving a large strainer area.

I claim:

1. Piping for use in liquid collection and distribution comprising in combination an extruded pipe having in cross-section an interior opening and on one side a pair of outwardly projecting spaced arms each having a re-entrant lip adjacent its outer end, thereby forming a support channel with re-entrant sides extending along the pipe, and at least one channel-section strainer member adapted to be slid endwise longitudinally into the support channel with each side of the channel of the strainer member being received snugly between the lip of a respective support channel side and the outer surface of the pipe and the bottom of the channel-section strainer bridging between the support channel sides and being formed with strainer perforations.

2. The combination as claimed in claim 1 wherein said arms extend generally parallel to one another and symmetrically with respect to a transverse median of the pipe, and the strainer member is of a generally rectangular cross-section.

3. The combination as claimed in claim 2 wherein the pipe is generally circular in cross-section and said arms extend symmetrically with respect to a diameter of the pipe.

4. The combination as claimed in claim 1 wherein the external surface of the pipe is curved in cross-section and the upper edges of the channel sides of the strainer member conform to the angle defined between the surface of the pipe and the inner sides of the support channel.

5. The combination as claimed in claim 1 wherein the outer edges of the sides of the support channel and of the re-entrant lip are smoothly rounded.

6. The combination as claimed in claim 1 wherein the perforations in the strainer member comprise uniformly spaced slots extending transversely across the bottom of the channel of the strainer member.

7. The combination as claimed in claim 6 wherein the perforations flare outwardly through the thickness of the strainer channel bottom toward the inner side of the strainer member.

8. The combination as claimed in claim 1 comprising a plurality of said strainer members each of uniformly short length as compared with the pipe length and adapted to be butted together end to end to form a continuous strainer extending along the length of the support channel.

9. The combination as claimed in claim 1 wherein said pipe is molded of synthetic resin.

10. The combination as claimed in claim 1 wherein said strainer member is extruded of synthetic resin.

11. The combination as claimed in claim 10 wherein the strainer member has a laterally projecting wear rib extending longitudinally continuously along the outer face of each of its channel sides.

12. Liquid-distributing and collecting piping comprising the combination as claimed in claim 1, having a plurality of apertures spaced longitudinally along the pipe length through the wall of the pipe between the support channel sides, said at least one strainer member being received within the support channel, and end capping means closing one end of the pipe and the end of the support channel and adjacent thereto.

13. Piping as claimed in claim 12 wherein said support channel terminates at a point spaced from said one end of the pipe and said end capping means comprise a cap member threaded onto said one end of the pipe.

* * * * *